(12) United States Patent
Zhang et al.

(10) Patent No.: US 8,189,489 B2
(45) Date of Patent: May 29, 2012

(54) CHARACTERIZATION OF NETWORK PATH QUALITY FOR NETWORK APPLICATIONS AND SERVICES

(75) Inventors: Ming Zhang, Bellevue, WA (US); Peter Bernard Key, Harwick (GB); Sandeep Kishan Singhal, Kirkland, WA (US); Guobin Shen, Beijing (CN); Ayalvadi Jagannathan Ganesh, Bristol (GB); Thomas Karagiannis, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1079 days.

(21) Appl. No.: 11/861,821

(22) Filed: Sep. 26, 2007

(65) Prior Publication Data

US 2009/0080336 A1    Mar. 26, 2009

(51) Int. Cl.
*H04L 12/26* (2006.01)
(52) U.S. Cl. .................. 370/248; 370/252; 370/395.21; 370/400
(58) Field of Classification Search .................. 370/218, 370/229, 241, 248, 395.21, 216, 252, 238, 370/244, 392, 477, 400; 709/224, 249, 234
See application file for complete search history.

(56) References Cited

U.S. PATENT DOCUMENTS

| | | | | |
|---|---|---|---|---|
| 6,665,702 | B1 | 12/2003 | Zisapel et al. | |
| 6,873,619 | B1 * | 3/2005 | Edwards | 370/392 |
| 7,046,636 | B1 * | 5/2006 | Shaffer et al. | 370/252 |
| 7,496,039 | B2 * | 2/2009 | Yamada et al. | 370/238 |
| 7,519,705 | B1 * | 4/2009 | Papagiannaki et al. | 709/224 |
| 2002/0145981 | A1 * | 10/2002 | Klinker et al. | 370/244 |
| 2002/0150041 | A1 * | 10/2002 | Reinshmidt et al. | 370/216 |
| 2002/0152326 | A1 * | 10/2002 | Orshan | 709/249 |
| 2002/0199016 | A1 | 12/2002 | Freedman | |
| 2003/0074443 | A1 * | 4/2003 | Melaku et al. | 709/224 |
| 2003/0086425 | A1 | 5/2003 | Bearden et al. | |
| 2003/0191841 | A1 | 10/2003 | DeFerranti et al. | |
| 2004/0008688 | A1 * | 1/2004 | Matsubara et al. | 370/395.21 |
| 2005/0091378 | A1 | 4/2005 | Nonnenmacher | |
| 2005/0169313 | A1 * | 8/2005 | Okamura et al. | 370/477 |
| 2005/0207349 | A1 * | 9/2005 | Nagami et al. | 370/241 |
| 2006/0067294 | A1 | 3/2006 | Netravali et al. | |
| 2006/0165009 | A1 * | 7/2006 | Nguyen et al. | 370/252 |
| 2006/0274760 | A1 | 12/2006 | Loher | |
| 2007/0127372 | A1 * | 6/2007 | Khan et al. | 370/229 |
| 2008/0114892 | A1 * | 5/2008 | Bruno et al. | 709/234 |
| 2009/0274056 | A1 * | 11/2009 | Meddour et al. | 370/248 |

OTHER PUBLICATIONS

Stefan Savage. The end-to-end effects of Internet path selection. Jul. 30, 2007. http://delivery.acm.org/10.1145/320000/316233/p289-savage.pdf?key1=316233&key2=6602474811&coll=GUIDE&dl=GUIDE&CFID=24166511&CFTOKEN=76699822.

(Continued)

*Primary Examiner* — Hassan Kizou
*Assistant Examiner* — Toan Nguyen
(74) *Attorney, Agent, or Firm* — Lee & Hayes, PLLC

(57) ABSTRACT

A service for facilitating a determination of path quality between a first endpoint node and a second endpoint node in a network of nodes is provided. Path quality information is aggregated from across network internet service providers (ISPs), giving authorized endpoints access to path quality information for specified path segments of a path to another endpoint. Path quality information includes one or more metrics that measure available bandwidth, loss rate and/or latency.

20 Claims, 17 Drawing Sheets

OTHER PUBLICATIONS

Ratul Mahajan. Negotiation-Based Routing Between Neighboring ISPs. Jul. 30, 2007. http://www.usenix.org/event/nsdi05/tech/full_papers/mahajan_negotiation/mahajan_negotiation_html/.

Aditya Akella,. An empirical evaluation of wide-area internet bottlenecks. Oct. 27, 2003. http://delivery.acm.org/10.1145/950000/948219/p101-akella.pdf ?key=948219&key2=7182474811&coll=GUIDE&dl=GUIDE&CFID=24167442&CFTOKEN=85125253.

Ming Zhang. PlanetSeer: Internet Path Failure Monitoring and Characterization in Wide-Area Services. Jul. 30, 2007. https://www.usenix.org/publications/library/proceedings/osdi04/tech/full_papers/zhang/zhang_html/.

* cited by examiner

CHARACTERIZATION OF NETWORK PATH QUALITY FOR NETWORK APPLICATIONS AND SERVICES

TECHNICAL FIELD

The subject disclosure relates to characterizing path quality for a distributed packed based network, such as the Internet, and to enabling endpoint access to path quality information for ensuring optimal communications with network applications and services.

BACKGROUND

By way of background, the quality of paths taken for network traffic, such as Internet traffic, is critical for many network applications. For instance, the performance of online streaming applications directly depends on loss rate of the underlying network paths, the web browsing experience depends on network latency between client and server and file downloading time depends on network bandwidth. Given the importance of path quality, it would thus be desirable to consider path quality when performing route selection for applications. However, due to the distributed nature of current Internet infrastructure, obtaining path quality information is challenging.

Related in some sense, three metrics that have general applicability to packet-based networks with respect to quality of path for a given connection are network latency, loss rate and bandwidth.

Latency in a packet-switched network is measured either one-way, i.e., the time from the source sending a packet to the destination receiving it, or round-trip, i.e., the one-way latency from source to destination plus the one-way latency from the destination back to the source. Round-trip latency is more often used because it can be measured from a single point. It is noted that round trip latency excludes the amount of time that a destination system spends processing the packet. Many software platforms provide a service called ping that can be used to measure round-trip latency. Ping performs no packet processing, merely sending a response back when it receives a packet, i.e., performs a no-op, thus it is a relatively accurate way of measuring latency.

Packet loss in turn occurs when a large amount of traffic, also referred to as congestion, on the network causes dropped packets. As any user of video streaming applications has witnessed, when caused by network problems, lost or dropped packets can result in highly noticeable performance issues or jitter. Similar problems result with voice over internet protocol (VoIP) applications, online gaming applications, video-conferencing applications and so on. Since the nature of the information is lost, without inherent redundancy of data, packet loss will affect just about all other network applications as well.

Some network transport protocols, such as transmission control protocol (TCP), by their very nature provide for reliable delivery of packets. For instance, with some reliable network protocols, in the event of packet loss, the receiver asks for retransmission, or, the sender automatically resends any segments that have not yet been acknowledged by the receiver. In certain highly reliable variants of TCP, if a transmitted packet is lost, it is re-sent along with every packet that had been sent after it. This retransmission causes the overall throughput of the connection to drop. Thus, although TCP can recover from packet loss, there is a tradeoff between retransmitting missing packets and maintaining throughput levels.

At the other end of the sliding scale or spectrum of network protocols that exist are unreliable protocols, such as user datagram protocol (UDP), which are faster because they provide no recovery for lost packets. Applications that use UDP must handle or make decisions about the packet loss condition on their own. Thus, under some circumstances, there is a tradeoff between throughput and packet loss.

Along with loss rate and network latency, the concept of "bandwidth," also referred to as "throughput," is central to digital communications, and specifically to packet networks, as it relates to the amount of data that a link or network path can deliver per unit of time. In this regard, bandwidth quantifies the data rate that a network link or a network path can handle or transfer. Measurement of network bandwidth is of increasing importance for many Internet applications and protocols, especially those involving the transfer of large files and those involving the delivery of content with real-time quality of service (QoS) constraints, such as streaming media.

For many data intensive applications, such as file transfers or multimedia streaming, there is no doubt that the bandwidth available to the application directly affects application performance. In general, existing bandwidth estimation tools measure one or more of three related metrics: capacity, available bandwidth, and bulk transfer capacity (BTC). One conventional system estimates the capacity of each link on a network path, measuring the data transmission time on each link, by taking the difference between the round trip times (RTTs) from a source link to two adjacent routers. However, to filter out measurement noises due to factors such as queuing delay, a large number of probing packets are required in order to find the smallest RTT values for the final calculation. Consequently, such conventional technique has been observed to have an unacceptably large probing overhead.

With respect to other attempts, one way of classifying bandwidth estimation techniques is based on whether they conduct hop-by-hop or end-to-end measurements. Hop-by hop techniques rely on incrementally probing routers along a path and timing their Internet Control Message Protocol (ICMP) replies, whereas end-to-end techniques base their bandwidth estimation on end-host replies only. Another classification of bandwidth measurement techniques is based on whether they measure the bottleneck bandwidth or the available bandwidth of a path.

Also, two different measures used in end-to-end network bandwidth estimation are bottleneck bandwidth, or the maximum transmission rate that could be achieved between two hosts at the endpoints of a given path in the absence of any competing traffic, and available bandwidth, the portion of the bottleneck bandwidth along a path that could be acquired by a given flow at a given instant in time. Both of these measures have independent applicability in that each captures different relevant properties of the network. For instance, bottleneck bandwidth is a static baseline measure that applies over long time-scales, up to the time-scale at which network paths change, and is independent of the particular traffic dynamics at a time instant.

Available bandwidth in turn provides a dynamic measure of the load on, or residual capacity of, a path. Additional application-specific information is then applied before making meaningful use of either measure. Given the nature of the Internet, the latter problem of determining available bandwidth in a real-time manner is a challenging one.

Currently available bandwidth estimation tools employ a variety of strategies to measure these metrics. A network manager with administrative access to the router or switch connected to a link of interest can measure some bandwidth metrics directly. Specifically, a network administrator can simply read information associated with the router/switch, e.g., configuration parameters, nominal bit rate of the link, average utilization, bytes or packets transmitted over some time period) using a network management protocol. However, such access is typically available only to administrators and not to end users.

On the other hand, without any information from network routers, end users can only estimate the bandwidth of links or paths from end-to-end measurements. Even network administrators sometimes need to determine the bandwidth from hosts under their control to hosts outside their infrastructures, and so they rely on end-to-end measurements too. Some conventional systems have measured these bandwidth-related metrics on a network link or on an end-to-end path.

Current techniques used to detect bottleneck positions have problems such as high probing overhead and low measurement accuracy. In another conventional system, Recursive Packet Trains (RPT) are used to detect network congestion position. RPT combines two types of probing packets—measurement packets and load packets—in a single probing packet train. The idea is to let load packets generate a packet queue on the router, and to use the measurement packets at the beginning and the end of the train to measure the packet train length. By detecting the changes in the packet train length, the congestion points of the network path are derived.

The most widely used active probing tools are ping and traceroute. Ping uses an ICMP echo packet to measure the round-trip time (RTT) to a specific destination. Traceroute sets a time to live (TTL) in the internet protocol (IP) header to trigger responses from the routers along the network path, thus collecting the hostname and RTT of the routers. However, the only performance information provided by these tools is RTT, which is not the whole story when it comes to congestion.

Bandwidth estimation techniques, specifically available bandwidth estimation algorithms, measure network throughput, which is more closely related to congestion. However, they provide no location information for the congestion point and need the cooperation of the destination. That makes them very hard to deploy.

In sum, the only viable solution to measure Internet path quality thus far has been through end-to-end probing. Although conceptually simple, there are a few notable disadvantages with end-to-end probing. First, without router support in conventional end-to-end probing systems as described above, inaccuracies result, i.e., such techniques depend on router support for accuracy. It would thus be desirable to free network endpoints from having to involve routers in order to obtain information about path quality.

Moreover, end-to-end probing between all pairs of hosts is not scalable. In short, to have information available about all paths in a network according to convention end-to-end probing techniques, measuring endpoint to endpoint in a network as large as the Internet including N endpoints involves approximately N squared endpoint to endpoint path measurements.

Some conventional end-to-end probing have involved an intermediate host. Comparing communications from a source endpoint to a target endpoint directly, with communications that reach target endpoint indirectly through the intermediate host, via triangulation principles, can also help an endpoint measure path quality, however, the addition of another host only increases overhead where it is unacceptably high.

Multi-homing techniques have attempted to improve path quality by adding alternate paths to a target endpoint via an intermediate endpoint, however, these solutions depend on use of the intermediate endpoint, add to network traffic, and do not serve to give endpoints a holistic view of path quality to the services they use. In this regard, path selection today is limited to capabilities of Internet Service Providers (ISPs) and their respective points of presence (PoPs). In this respect, each endpoint is limited by paths through respective ISPs. In some cases, two ISPs have cooperated to allow traffic through each other's nodes under a sharing agreement, which tends to improve bandwidth overall since one set of nodes may offer better path quality than another set of nodes at a given moment. In effect, this can help balance out congestion points by offloading traffic to another ISP. However, such micro cooperation among ISPs, while beneficial to the Internet user community, does not help endpoints understand path quality.

Accordingly, as the above survey of conventional systems illustrates, obtaining path quality information by end users is extremely challenging in the current Internet. Thus, simpler techniques for characterizing path quality between any pair of hosts on the Internet are desirable. Given the importance of path quality, it is also desirable to be able to consider path quality when performing route selection for network applications. The above-described deficiencies of path quality information gathering techniques are merely intended to provide an overview of some of the problems of conventional systems, and are not intended to be exhaustive. Other problems with the state of the art and corresponding benefits of the invention may become further apparent upon review of the following description of various non-limiting embodiments of the invention.

SUMMARY

In consideration of the deficiencies of conventional systems, the invention provides a service for facilitating a determination of path quality between a first endpoint node and a second endpoint node in a network of nodes is provided. Path quality information is aggregated from across network internet service providers (ISPs), giving authorized endpoints access to path quality information for specified path segments of a path to another endpoint. Path quality information includes one or more metrics that measure available bandwidth, loss rate and/or latency.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

BRIEF DESCRIPTION OF THE DRAWINGS

Various techniques for characterizing path quality for different routes of a packet based network are further described with reference to the accompanying drawings in which.

DETAILED DESCRIPTION

Overview

As mentioned in the background, the main solution available today to determine path quality is through end-to-end probing techniques. However, end-to-end probing end-to-end probing is typically inaccurate without router support and/or not scalable. Simply put, it is undesirable to probe between every endpoint pair of a network as large as the Internet. Accordingly, the ability to characterize path quality between any pair of hosts on the Internet is desired. In consideration of these deficiencies in the state of the art, the invention provides an infrastructure for collecting and exposing information from ISPs to enable fast, accurate and scalable path quality inferences by endpoints.

In various non-limiting embodiments, the invention provides the ability to characterize and store path quality information between any pair of hosts on the Internet. An application of the path quality information is the selection of an Internet route between nodes in a packet based network by the nodes, and determining the aggregate path quality characteristics of the path segments comprising the complete path between the nodes.

Figure 1:
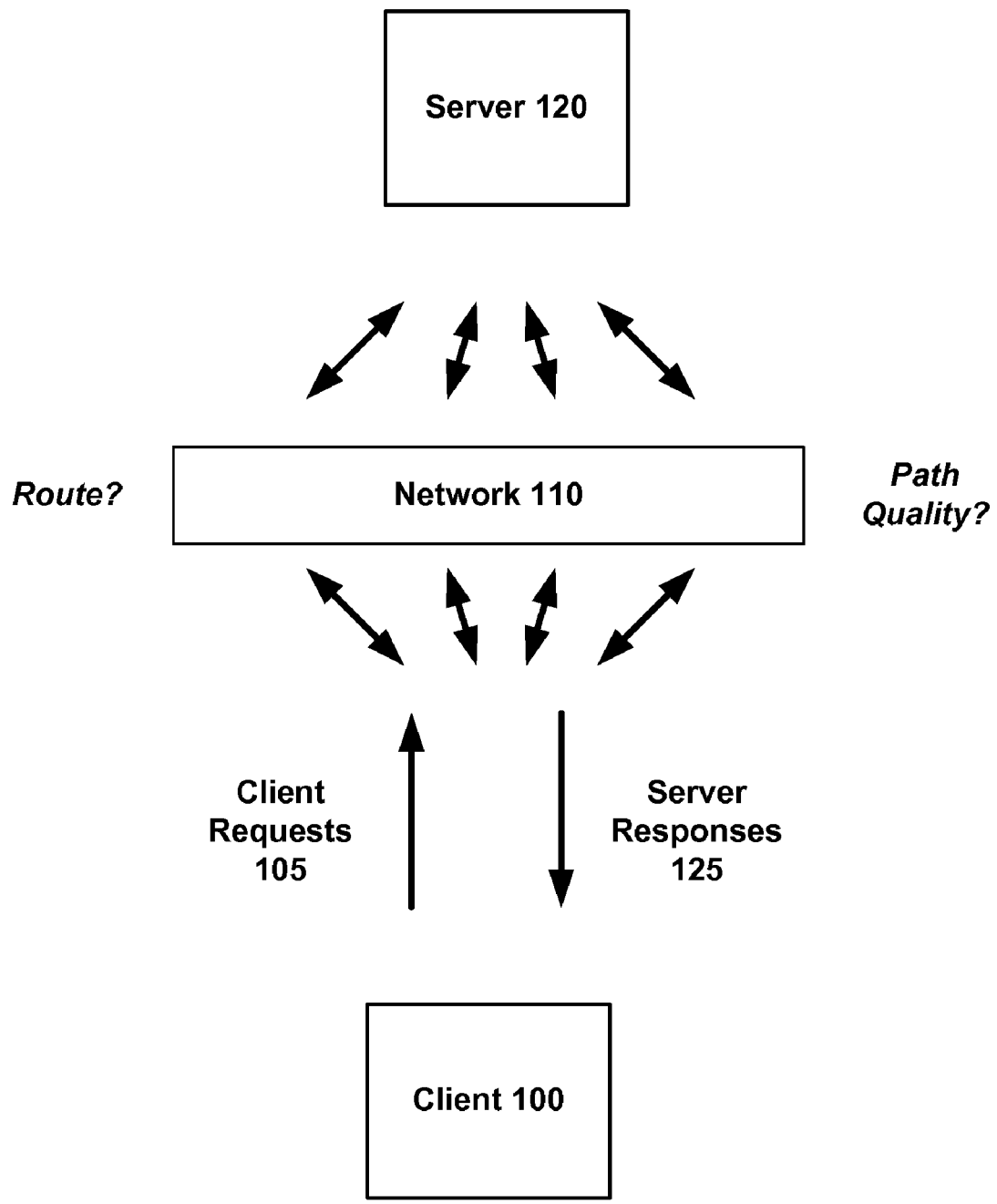
FIG. 1 illustrates a general Internet architecture presenting issues of network path quality addressed in accordance with the invention.

As shown in FIG. 1, in a simple non-limiting network topology, a client 100 makes requests 105 to a server 120, to which server 120 responds with responses 125. However, in today's network topology, route selection is limited to individual understanding within each ISP, and to end-to-end measurements having unacceptably high overhead, and lack of scalability. In other words, today, when an Internet path or route is selected from a variety of different routes, the decision is sub-optimal because a full set of path information is not considered or an attempt is made to gather an overwhelming amount of information. Given the living nature of the Internet, with endpoints joining and leaving all of the time, what is desired is more optimal access to path quality information.

Figure 2A:
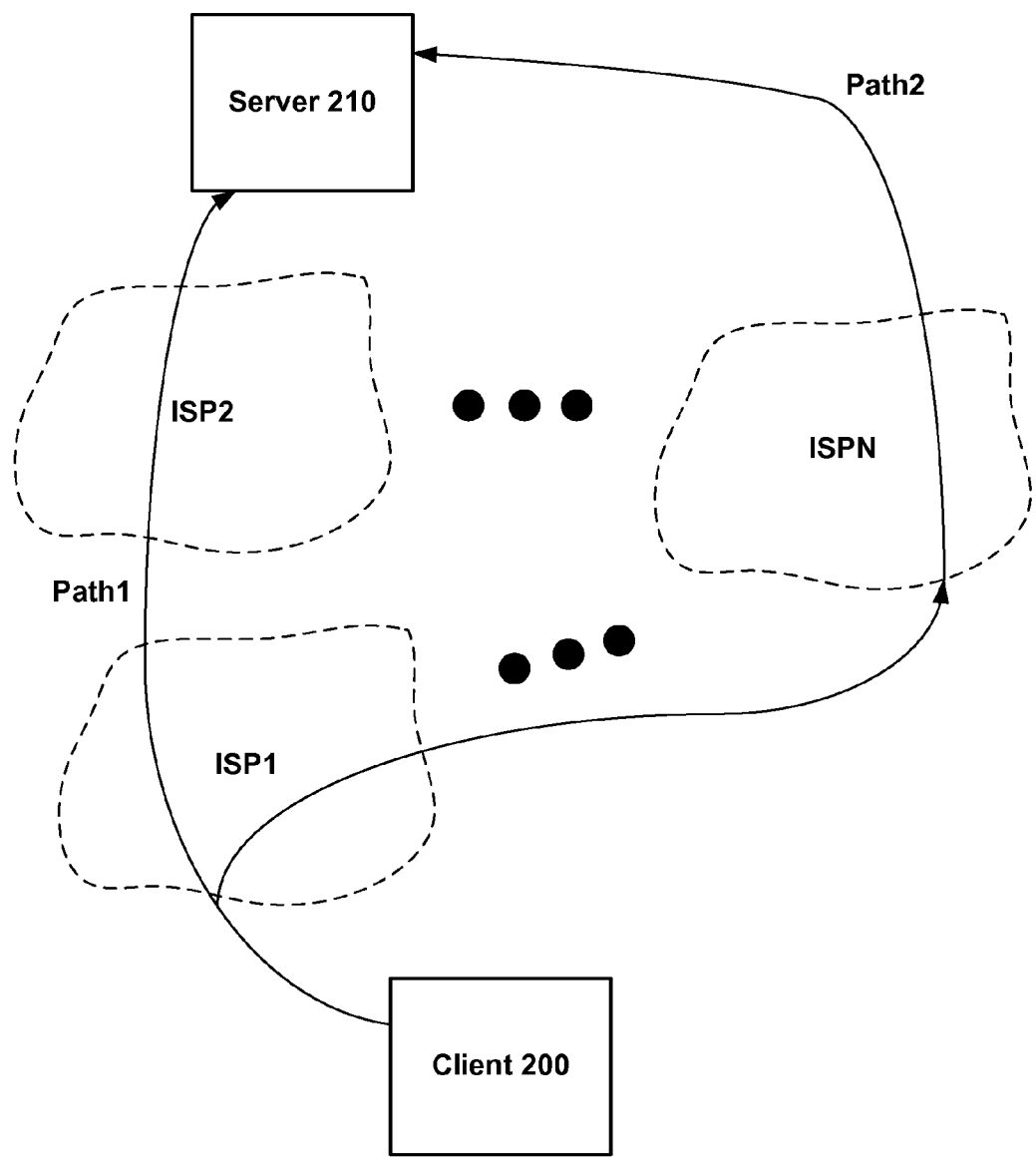
FIG. 2A is a block diagram illustrating alternate paths through different ISPs in a network for connecting two endpoints in accordance with the invention.

As shown in FIG. 2A, when a client 200 connects to a server 210 and a route is established, today, there are a variety of ISPs (there are ~20,000 different ISPs from small to large today) through which traffic may be routed. Some ISPs, such as the ISP hosting an endpoint's local DNS server, will be a necessary throughpoint, however, other ISPs may be determined by the other endpoint in the routing equation, others act as "go betweens," and most ISPs are not involved at all for a typical end to end connection.

However, today, if there are alternate paths among ISPs, such as ISP1, ISP2, . . . , ISPN, path quality information about the different or alternate routes to the destination is difficult to acquire at the time of connecting. Accordingly, today, there is no reliable and scalable way to determine, in advance, whether alternate paths path 1 or path 2 from client 200 to server 210 provides better path quality, or vice versa from server 210 to client 200.

Figure 2B:
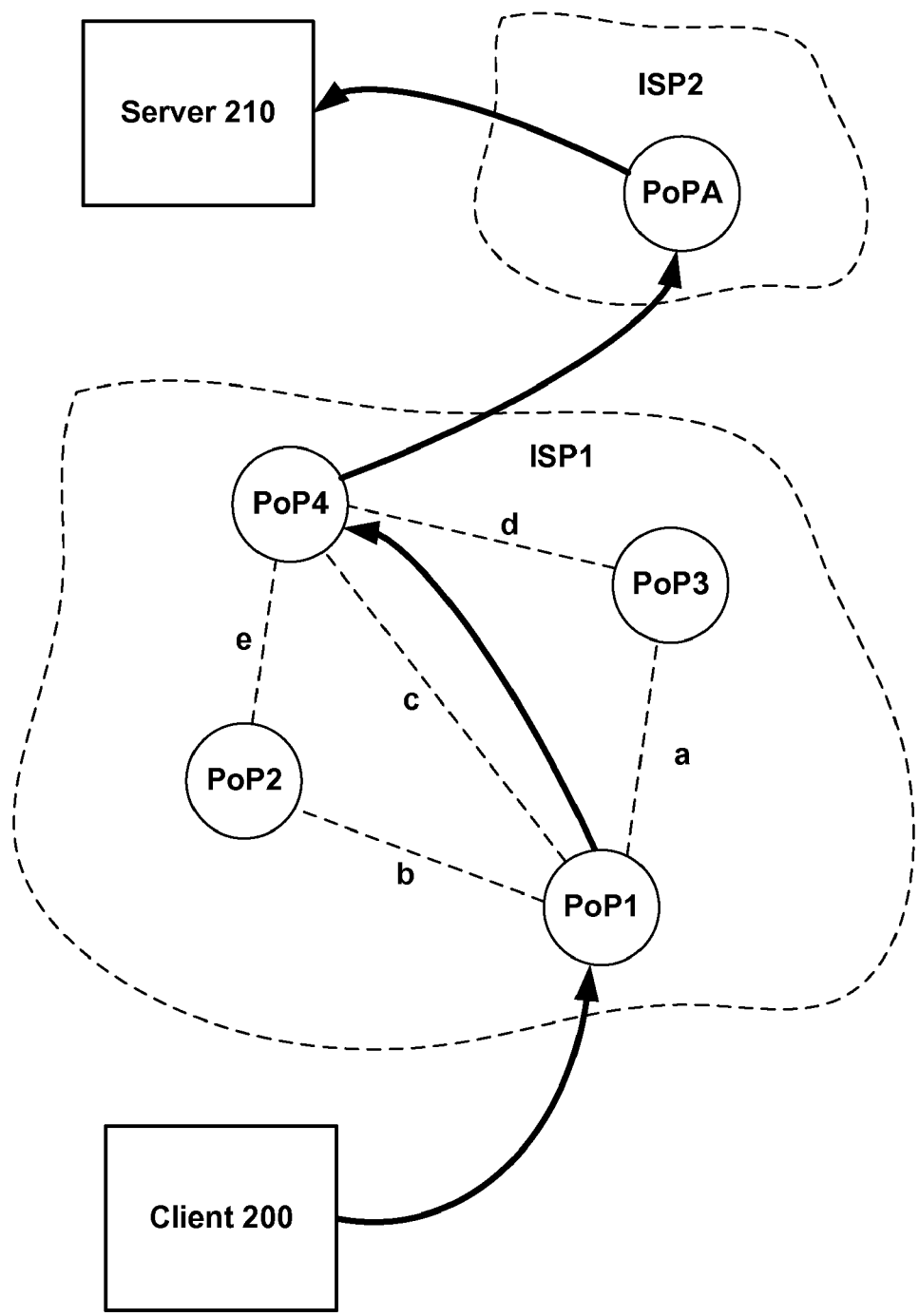
FIG. 2B is a block diagram illustrating alternate paths through different ISPs in a network having PoPs in accordance with the invention.

According to present Internet infrastructure, each ISP can be viewed further as a set of point of presences (PoPs). For instance, taking the example path1 of FIG. 2A, as shown in FIG. 2B, ISP1 may itself have four or more PoPs such as PoP1, PoP2, PoP3 and PoP4, defining paths a, b, c, d and e. Today, while ISP1 may know a fair amount of information about the flow of traffic within its control, ISP1 does not know anything about path qualities of segments outside of its jurisdiction. Thus, ISP1 might know that path PoP1 to PoP4 results in the fastest path from one location to another within its province of control, but will not know about what path to take within another ISP2 via PoPA, or even whether ISP2 offers the best path quality relative to some other ISP3 (not shown). In short, while some amounts of disjointed information are available in the network, very little information is available to endpoints today. Yet, the endpoints are the consumers and service providers, the very reason for having networks, and thus improved path quality services should be available.

Figure 3:
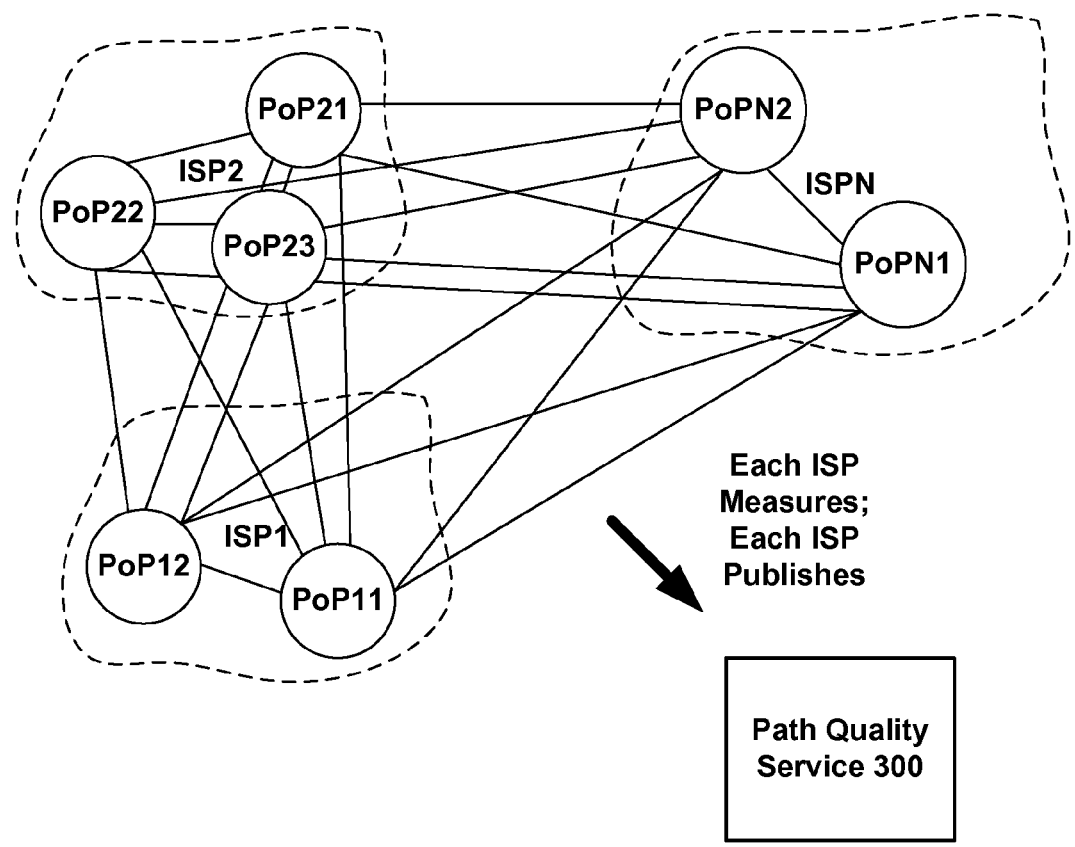
FIG. 3 is a block diagram illustrating different ISPs providing path quality information to a path quality service in accordance with the invention.

Accordingly, as shown in FIG. 3, rather than measure every endpoint to endpoint pair, the invention makes use of the intuition that there are a variety of popular paths "in the middle" of the network path, for which if path quality were known, characterizing path quality for any arbitrary path from one endpoint to another can be achieved by manipulating the measurements for the segments comprising the path.

Accordingly, N or a subset of N participating ISPs each collect measurements with respect to path quality for paths formed by PoPs within each ISP and for PoPs of neighboring PoPs, i.e., wherever a direct communication path or segment exists between PoPs. As shown in FIG. 3, ISP1 has PoP11 and PoP12, ISP2 has PoP21, PoP22 and PoP23 and ISPN has PoPN1 and PoPN2. Path quality measurements are recorded by each of the ISPs on an ongoing basis, and provided to path quality service 300 on an up to date basis, e.g., by synchronizing with path quality data maintained by the ISPs.

Having aggregated the information across ISPs, path quality service 300 can construct a table, or other storage representation, including path quality statistics and measurements for loss rate, throughput and latency across all path segments. Thus, where multiple or many different routes exist between two endpoints in the network, the path quality service 300 can be consulted, whereby the different routes are defined for the endpoints. From a relatively small number of paths, the best path can then be selected based on pre-determined or requested characteristics. Or, having been provided with all of the relevant path information from the table, the endpoint(s) can select or negotiate the best path. Or, based on a predetermined specification of a quality of service requirement, a client or network application can determine if the quality of service is in fact being met.

Figure 4A:
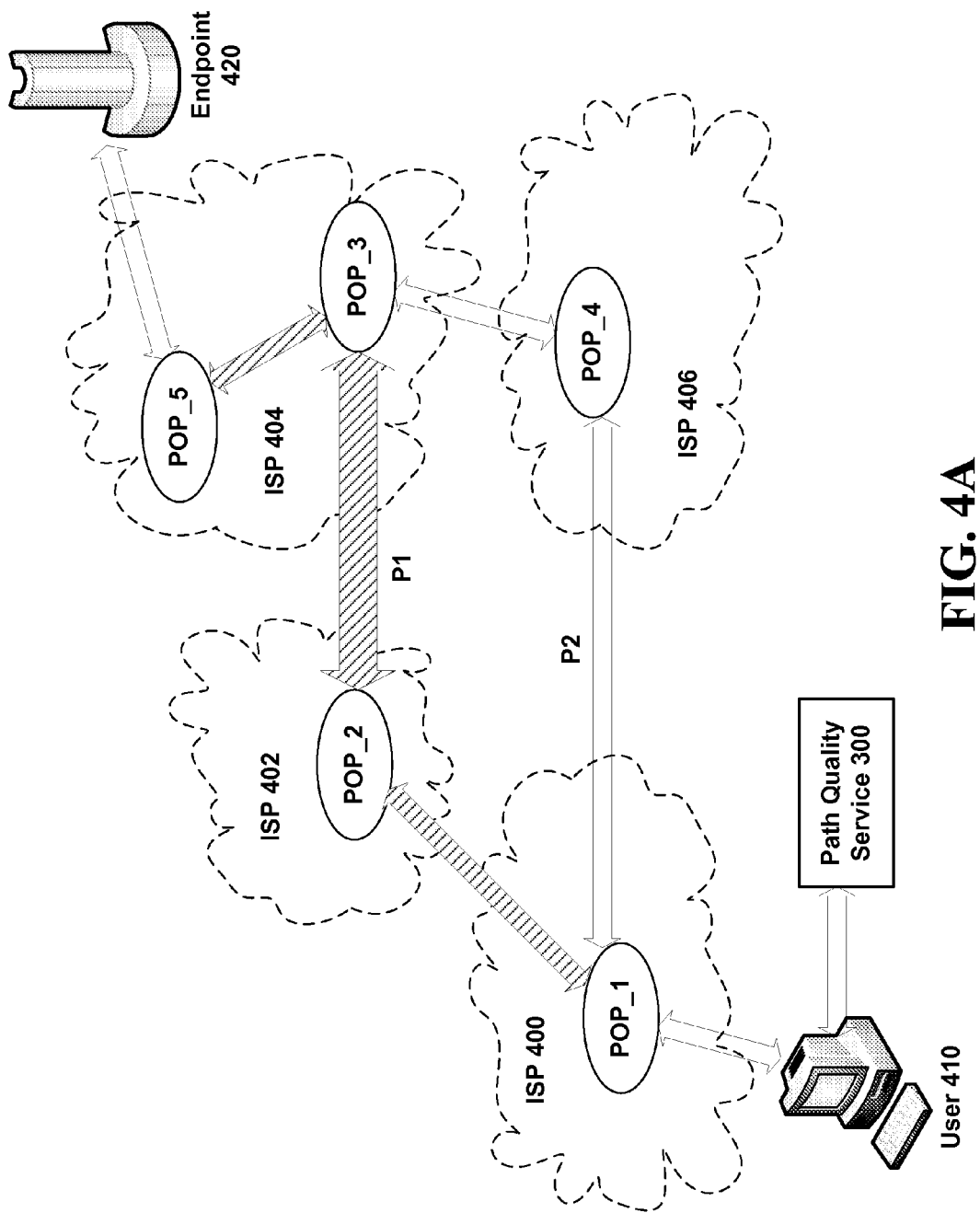
FIGS. 4A and 4B illustrate embodiments of the path quality service including different paths through a network topology for application of the invention at different times.

For instance, as shown in FIG. 4A, a user 410 (or endpoint 420) can consult with the path quality service 300 in order to optimize a bandwidth requirement of a streaming application. The path quality service 300 indicates the shaded path P2 is the best path at a given time, i.e., better than path P1.

Figure 4B:
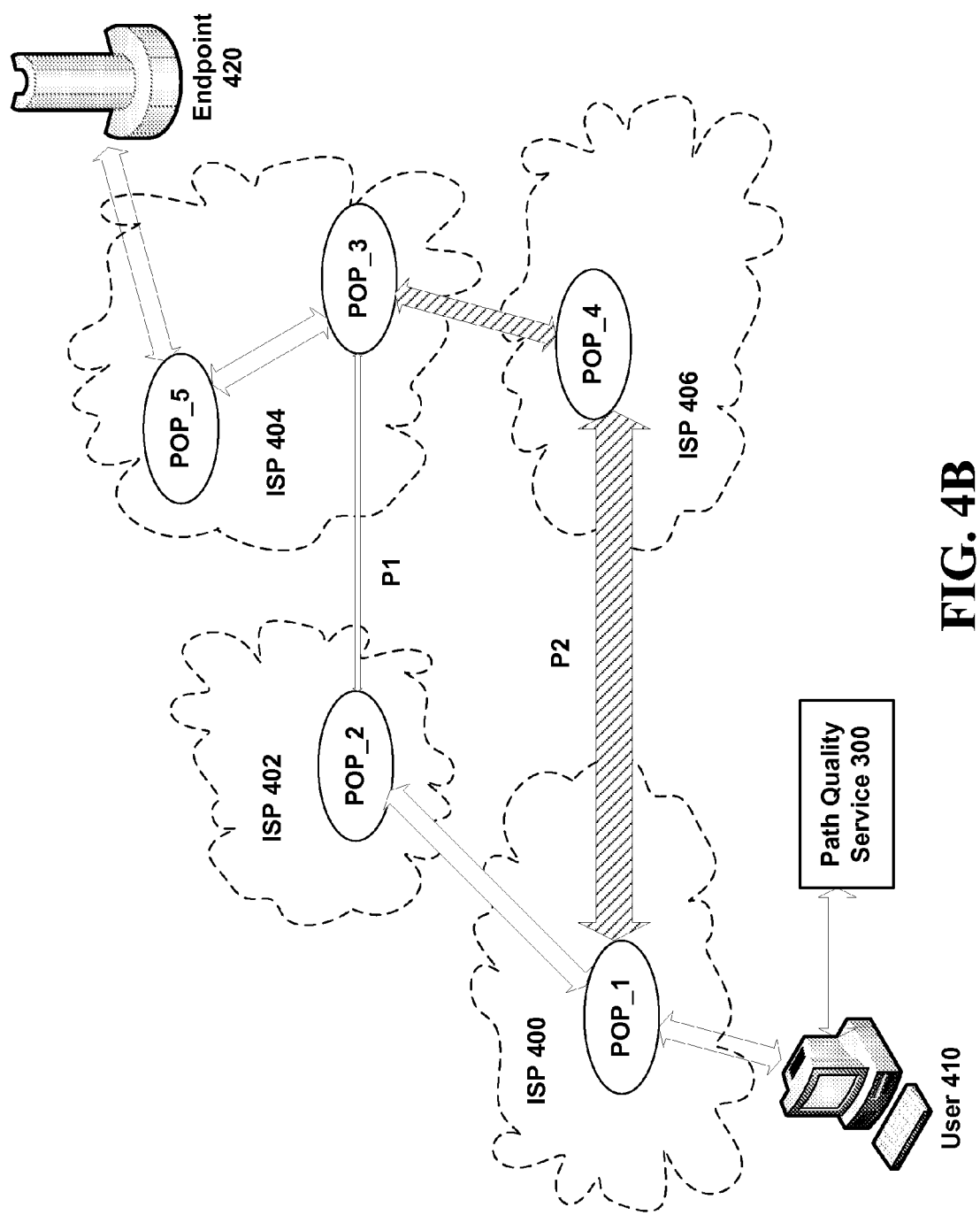

The ability to dynamically update path quality measurements across popular paths of a network is also advantageous in accordance with the invention. For instance, as shown in FIG. 4B, at a time later than the situation depicted in FIG. 4A, path characteristics may have changed. For instance, a hurricane may have eliminated critical equipment along the path between POP_2 and POP_3, making path P2 severely congested and of low path quality.

Accordingly, the next time endpoint 410 and endpoint 420 connect, path quality service 300 in turn can inform (or send the information in response to a request) the endpoint(s) that path P2 has become better than P1. Endpoint 410 can also register for updates, where if current path segments become suboptimal for a given set of application requirements, the path quality service 300 can inform the endpoint 410 of the better path. In this way, endpoint to endpoint path data can be reconstructed when needed from service 300 based on alternative paths through the PoPs rather than measure all end-to-end data as with conventional systems.

Supplemental Context Regarding Internet/ISP Infrastructure

For supplemental context regarding current infrastructure for the Internet and concomitant limitations on availability of universal path quality information, the following sets forth some additional background regarding ISPs and current Internet infrastructure.

ISPs are businesses or organizations that provide access to the Internet and related services to consumers. ISPs can be started by just about any individual or group with sufficient money and expertise. In addition to Internet access via various technologies such as dial-up and digital subscriber line (DSL), they may provide a combination of services including Internet transit, domain name registration and hosting, web hosting, and co-location.

ISPs employ a range of technologies to enable consumers to connect to their network. For end users, options include dial-up, DSL, Broadband wireless access, Cable modem, and Integrated Services Digital Network (ISDN). For customers who have more demanding requirements, such as medium-to-large businesses, or other ISPs, DSL, Ethernet, Metro Ethernet, Gigabit Ethernet, Frame Relay, ISDN, asynchronous transfer mode (ATM), satellite Internet access and synchronous optical network (SONET) are more typical. With the increasing popularity of downloading music and online video and the general demand for faster page loads, higher bandwidth connections are becoming more popular.

Just as their customers pay them for Internet access, ISPs themselves pay upstream ISPs for Internet access. In the simplest case, a single connection is established to an upstream ISP using any of the afore-mentioned technologies or others, and the ISP uses this connection to send or receive any data to or from parts of the Internet beyond its own network. In turn, the upstream ISP uses its own upstream connection, or connections to its other customers, usually other ISPs, to allow the data to travel from source to destination.

In reality, the situation is usually more complicated. For example, ISPs with more than one PoP may have separate connections to an upstream ISP at multiple PoPs, or they may be customers of multiple upstream ISPs and have connections to each one at one or more of their PoPs. ISPs may engage in peering, where multiple ISPs interconnect with one another at a peering point or Internet exchange point (IX), allowing the routing of data between their networks, without charging one another for that data—data that would otherwise have passed through their upstream ISPs, incurring charges from the upstream ISP. ISPs that require no upstream and have only customers and/or peers are called Tier 1 ISPs, indicating their status as ISPs at the top of the Internet hierarchy. Routers, switches, Internet routing protocols, and the expertise of network administrators all have a role to play in ensuring that data follows the best available route and that ISPs can communicate with one another on the Internet.

A PoP is thus an access point to the Internet. It is a physical location that houses servers, routers, ATM switches and digital/analog call aggregators. It may be either part of the facilities of a telecommunications provider that the ISP rents or a location separate from the telecommunications provider. ISPs typically have multiple PoPs, sometimes numbering as many in the thousands for the largest ISPs. PoPs are also located in Internet exchange points and colocation centers.

Characterizing Network Path Quality

As mentioned, network latency, loss rate and bandwidth are three relevant metrics for aiding in understanding path quality. Just for a few examples, the performance of online streaming applications directly depends on loss rate of the underlying network paths, the web browsing experience depends on network latency between client and server and file downloading time depends on network bandwidth. In accordance with the invention, the invention takes path quality into consideration when performing route selection for applications and services in a way that is reliable, scalable, and does not depend on router support.

Figure 5A:
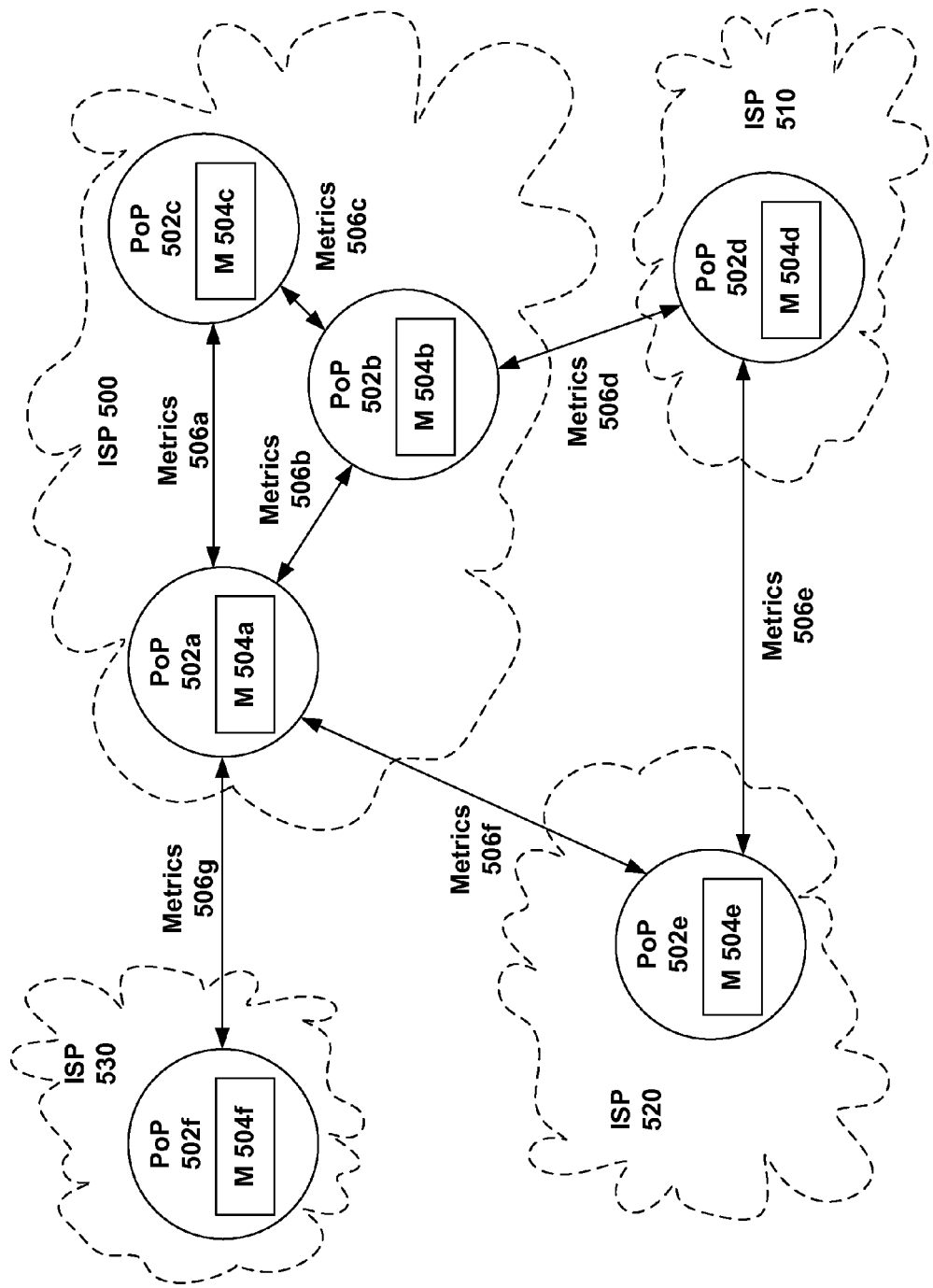
FIG. 5A illustrates cooperation from ISPs to measure path quality metrics at each PoP in accordance with the invention.

As shown in FIG. 5A, each ISP 500, 510, 520, 530 periodically measures path quality metrics 506a, 506b, 506c, 506d, 506e, 506f and 506g regarding the paths between each ingress-egress pair and each interconnection with its neighboring ISPs, as defined for PoPs 502a, 502b, 502c, 502d, 502e and 502f. The path metrics 506a, 506b, 506c, 506d, 506e, 506f and 506g of interest include latency, loss rate, and available bandwidth. In one embodiment, to obtain these measurements, ISP 500 and ISPs 510, 520 and 530 (the other participating ISPs) place measurement box 504a, 504b, 504c, 504d, 504e and 504f in PoPs 502a, 502b, 502c, 502d, 502e and 502f, respectively.

Figure 5B:
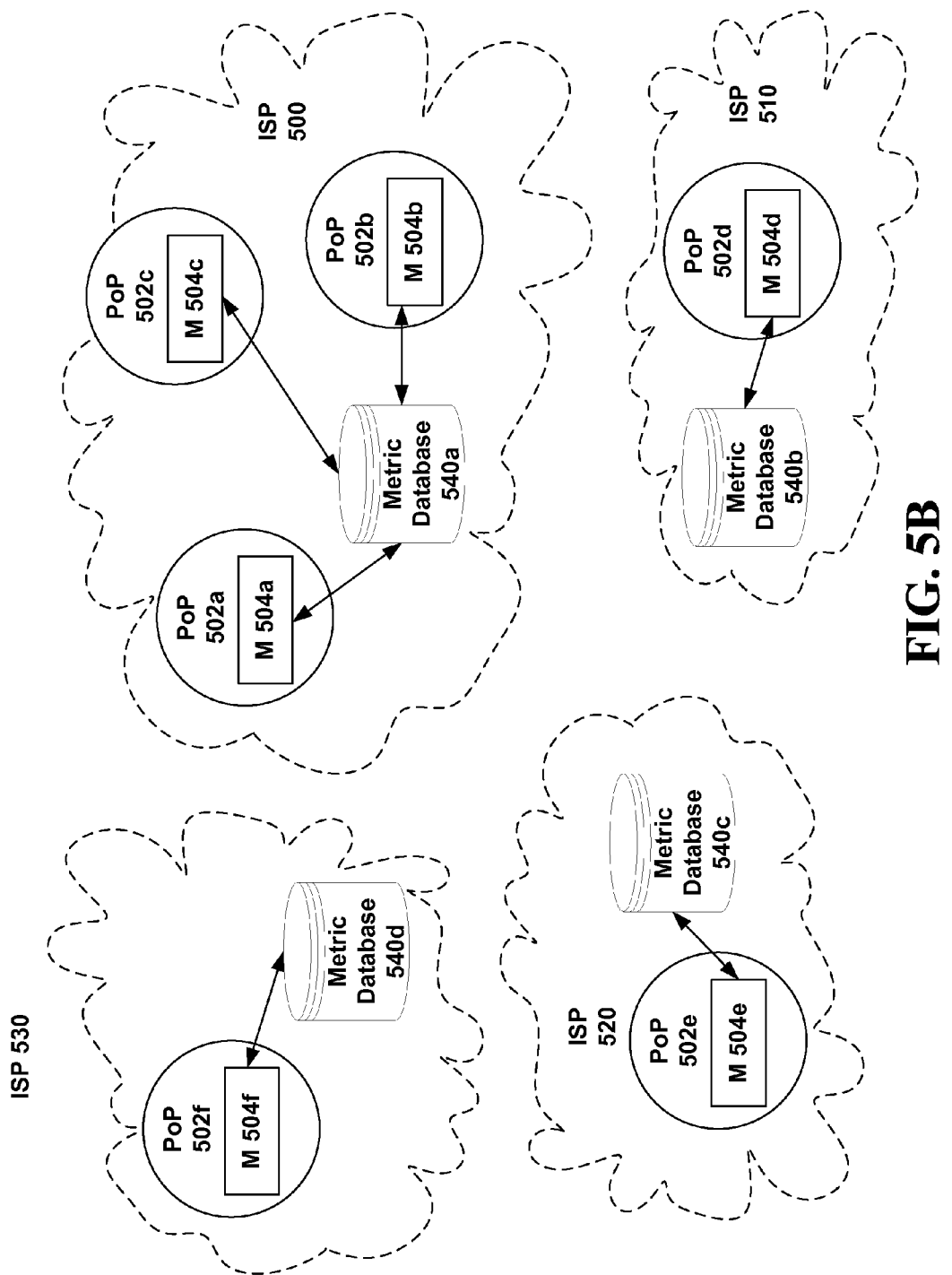
FIG. 5B illustrates cooperation from ISPs to aggregate path quality metrics at each ISP in accordance with the invention.

As shown in FIG. 5B, each ISP 500, 510, 520, 530 then puts all the measurement results in a database 540a, 540b, 540c, 540d, respectively, where any authorized third-party may query.

Figure 5C:
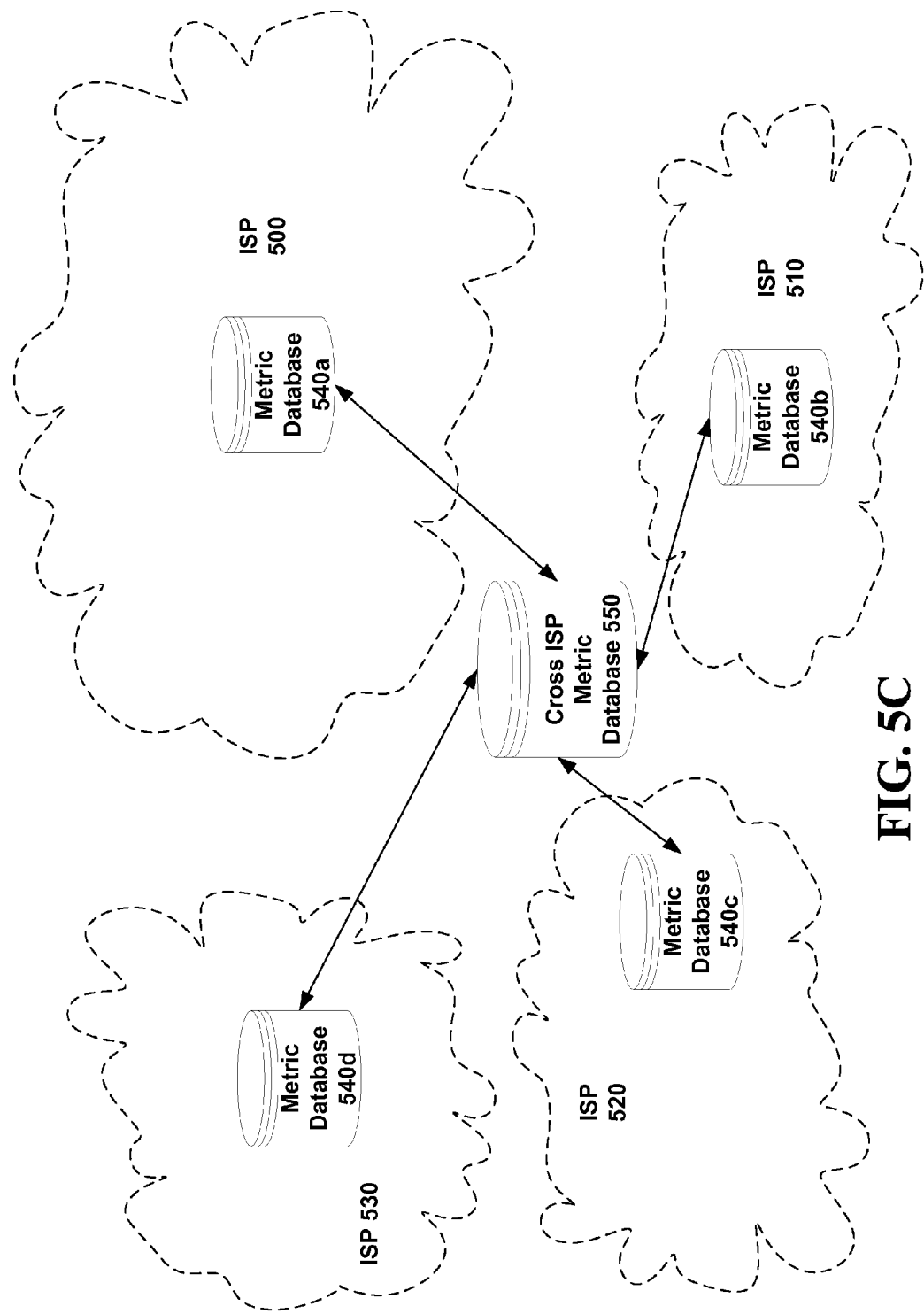
FIG. 5C illustrates cooperation from ISPs to aggregate path quality metrics across different ISPs in accordance with the invention to provide a common base of up to date path quality information among PoPs in the network in accordance with the invention.

As illustrated by FIG. 5C, a third party periodically queries the databases 540a, 540b, 540c, 540d of ISPs 500, 510, 520, 530 to obtain their most recent measurement results, and stores them in a cross ISP metric database 550. The third-party can pull this information into a centralized location or in a distributed fashion. There may be multiple third parties who can query an ISP 500, 510, 520, 530 for the information in metric databases 540a, 540b, 540c, 540d.

Figure 6A:
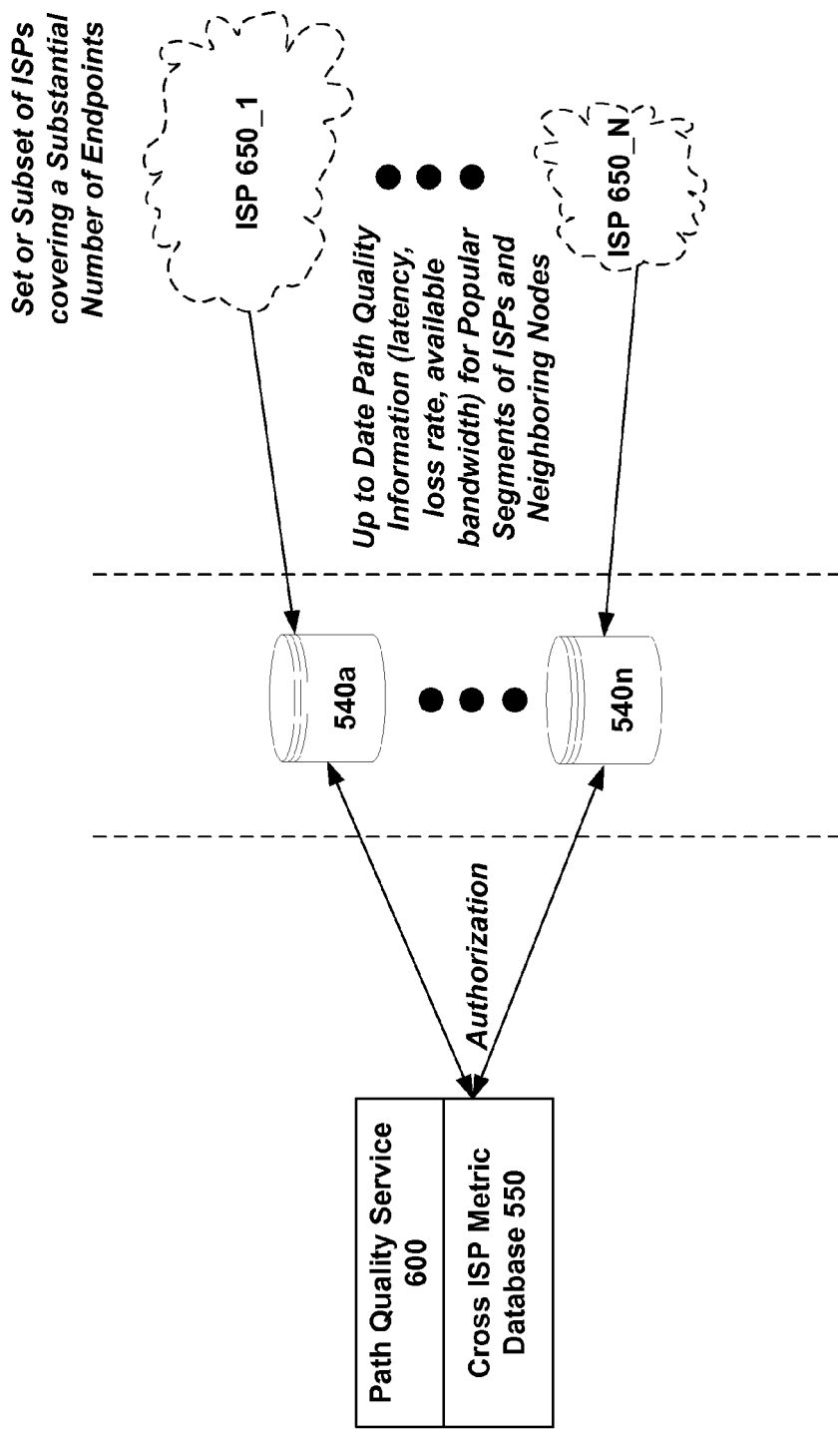
FIG. 6A is a block diagram generally illustrating the aggregation of PoP level path quality information as part of a path quality service exposed to endpoints in accordance with the invention.

As reflected in FIG. 6A, queries may require mutual agreements between the third party 550 and ISPs 650_1 to 650_N in order to have access to metric stores 540a to 540n. In this regard, according to the above technique for measuring path quality information by popular nodes of ISPs (or any subset of cooperating ISPs) 650_1 to 650_N and collecting this information in associated metric stores 540a to 540n, FIG. 6A illustrates that an aggregate database 550 of all the path quality information covering the main paths of the network can be maintained. On top of the path quality information aggregated across ISPs stored in store 550, any one of a variety of path quality services 600 can be provided in the network for consuming endpoints to consult and learn more about path qualities affecting their use of or attempted delivery of other network services.

The third party 600 uses the measurements of ISPs 650_1 to 650_N to compute path quality between each pair of PoPs. This can be done in a centralized place or in a distributed fashion. With respect to path segment combinations to compute an overall path quality metric for a set of path segments constituting an end to end path, the latency of a pair of PoPs can be computed by adding up the latency of all ingress-egress pairs and interconnections along the path. The available bandwidth can be computed by taking the minimum available bandwidth of any ingress-egress pairs or interconnections along the path. Loss rate can be computed by $1-\Pi^{(1-Ri)}$ where Ri is the loss rate between an ingress-egress pair or on an interconnection.

Figure 6B:
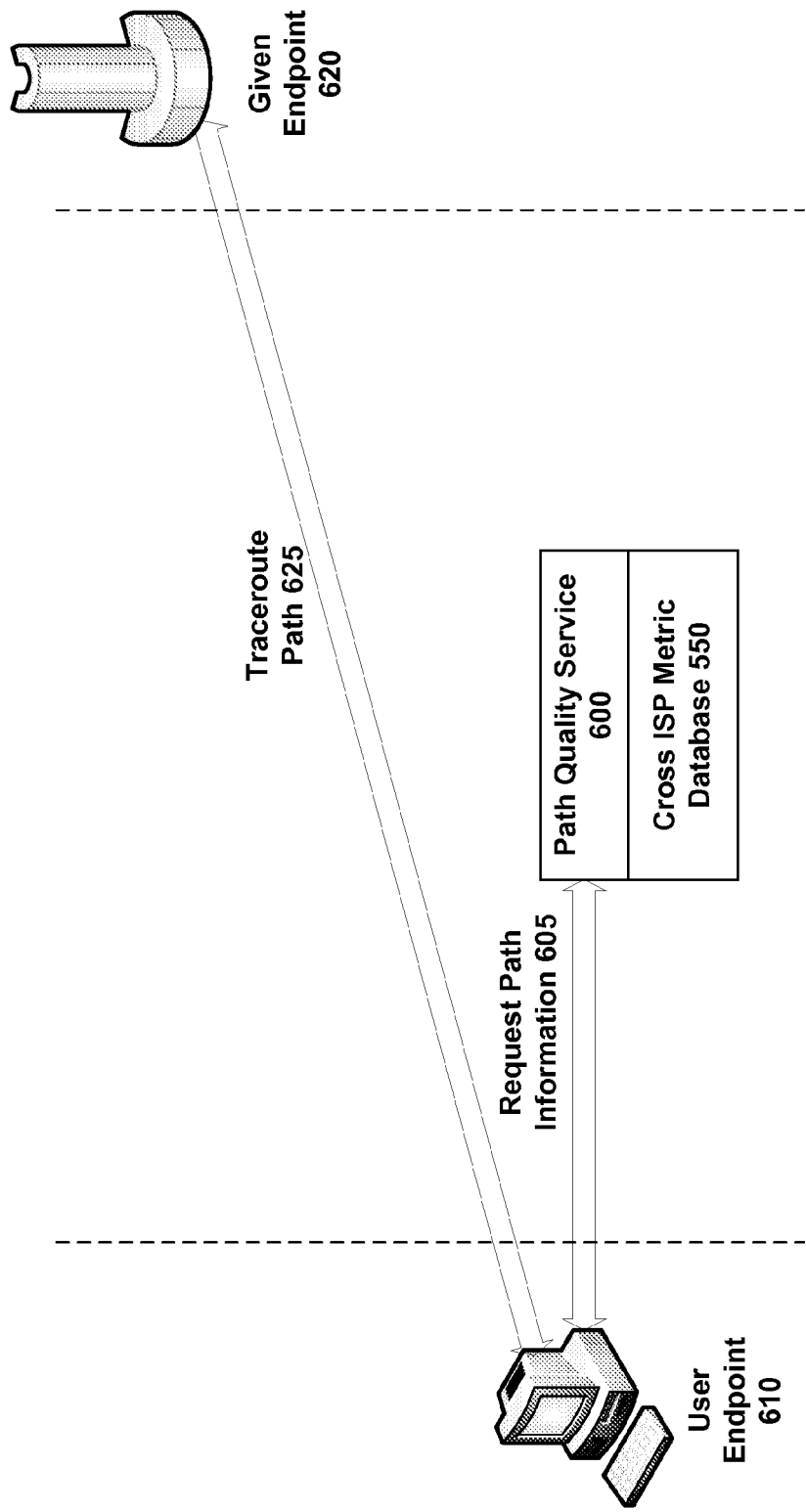
FIG. 6B illustrates an exemplary scenario where an endpoint determines path segments to a second endpoint and requests and receives path quality information about the path segments for further processing by the endpoint in accordance with the invention.

Thus, as shown in FIG. 6B, when a source 610 needs to compute the path performance to a destination 620, it may first discover the PoP-level path by traceroute 625. It then queries 605 the third-party 600 about the performance of the PoP-level path. There may be multiple third-parties 600 which the source can query. The source may also subscribe to a service provided by third party 600 before it can query.

Figure 6C:
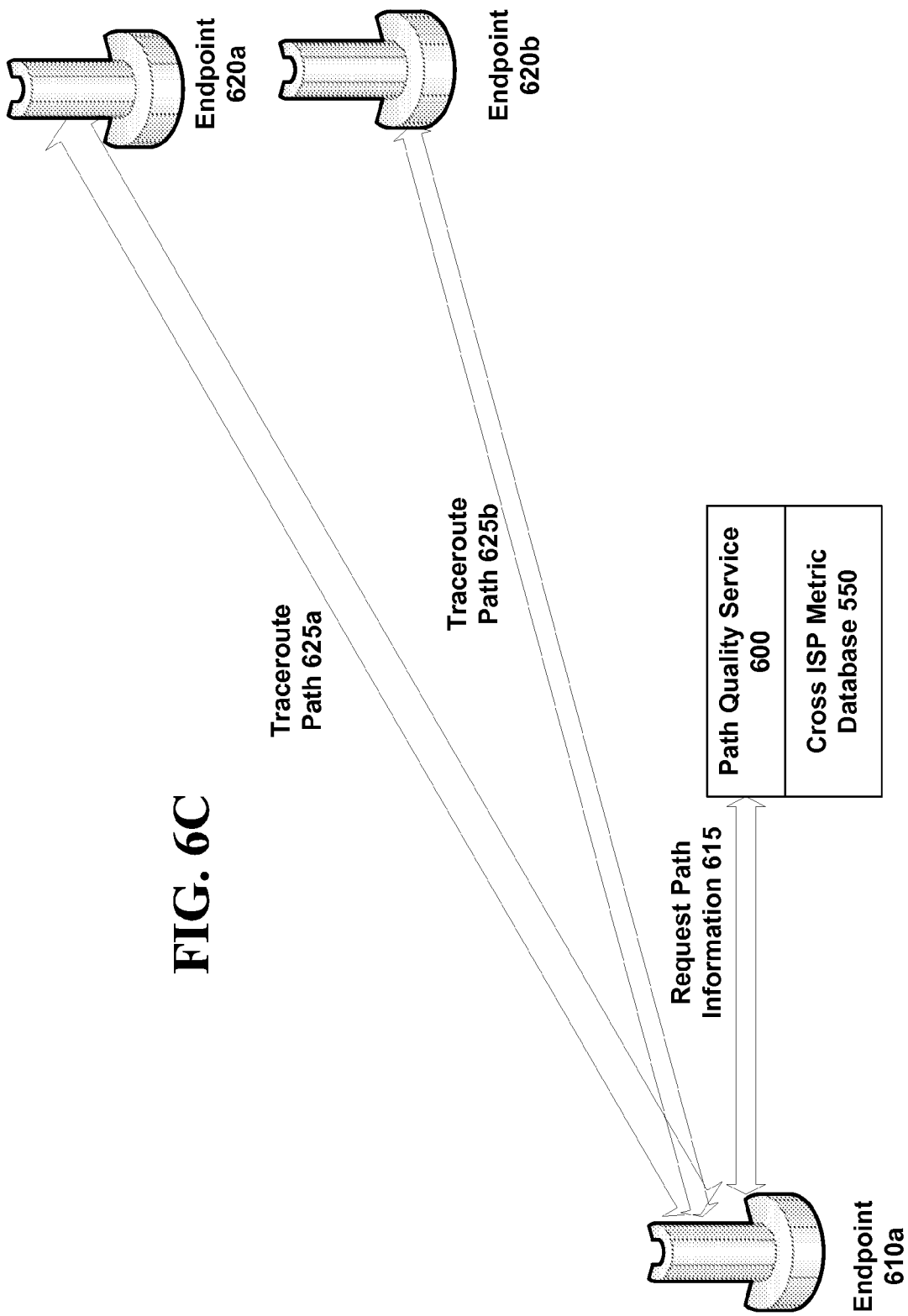
FIG. 6C illustrates an exemplary scenario where an endpoint makes a choice between two other endpoints based on path quality information in accordance with the invention.

As shown in FIG. 6C, one possible use for the invention is when an endpoint can make multiple choices having different paths. By defining the different path segments comprising traceroute paths 625a and 625b, endpoint 610a can better select endpoint 620a as having better path quality than endpoint 620b, for example.

Figure 7:
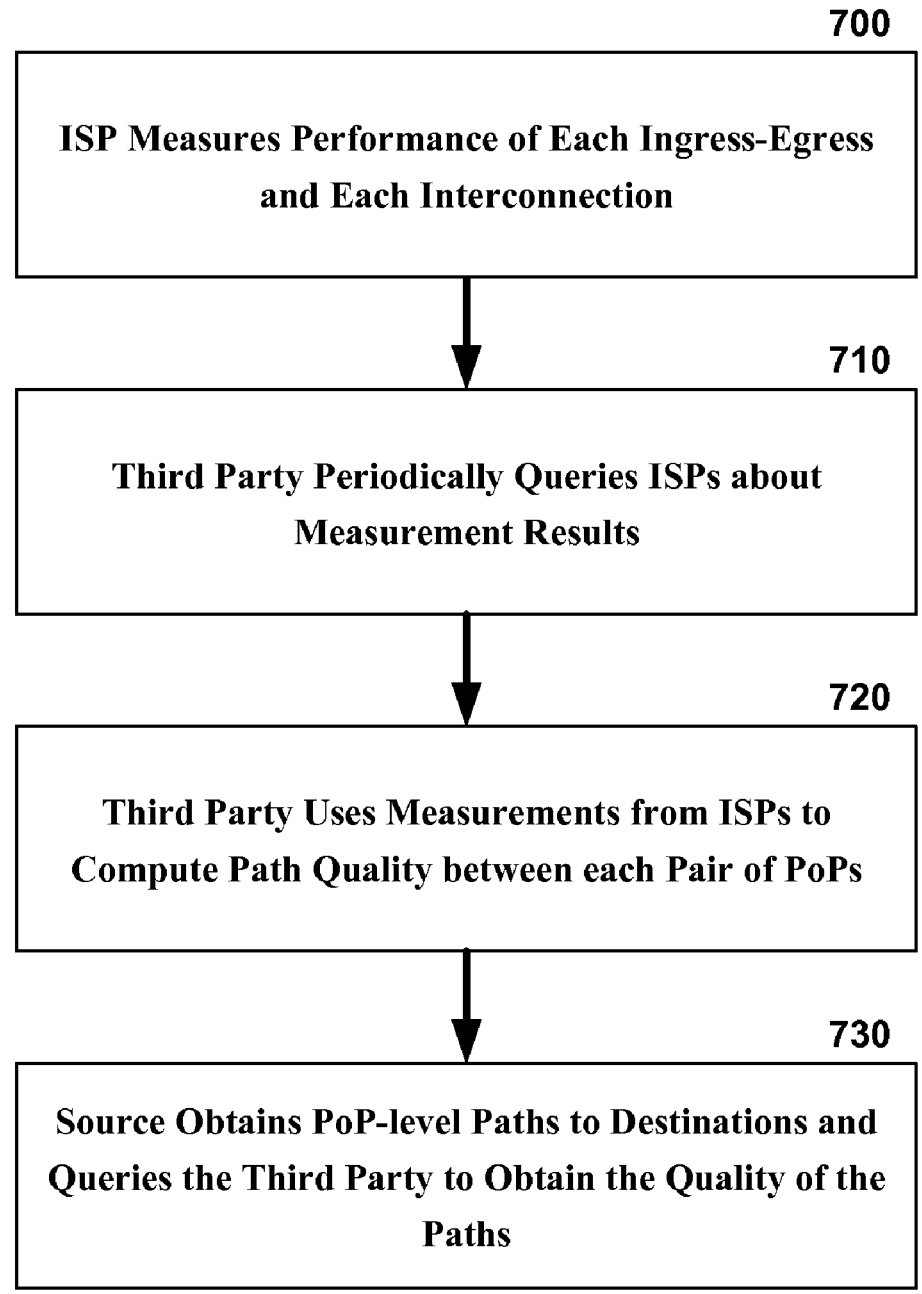
FIG. 7 is a flow diagram illustrating the exemplary measurement, aggregation, and exposure of PoP level path quality information in accordance with the invention.

FIG. 7 is a flow diagram illustrating an exemplary, non-limiting process for measuring and using path quality information in accordance with the invention. At 700, ISPs measure performance of each ingress-egress pair of nodes within their control, and each interconnection with other ISPs. At 710, third parties can query the ISPs for their measurement results. At 720, the third party then uses the measurements from the ISPs respecting path quality to compute path qualities between each pair of PoPs in the network irrespective of ISP. At 730, any source endpoint can obtain the PoP level paths to destination endpoints, and then query the third party to obtain the quality of the paths.

Figure 8:
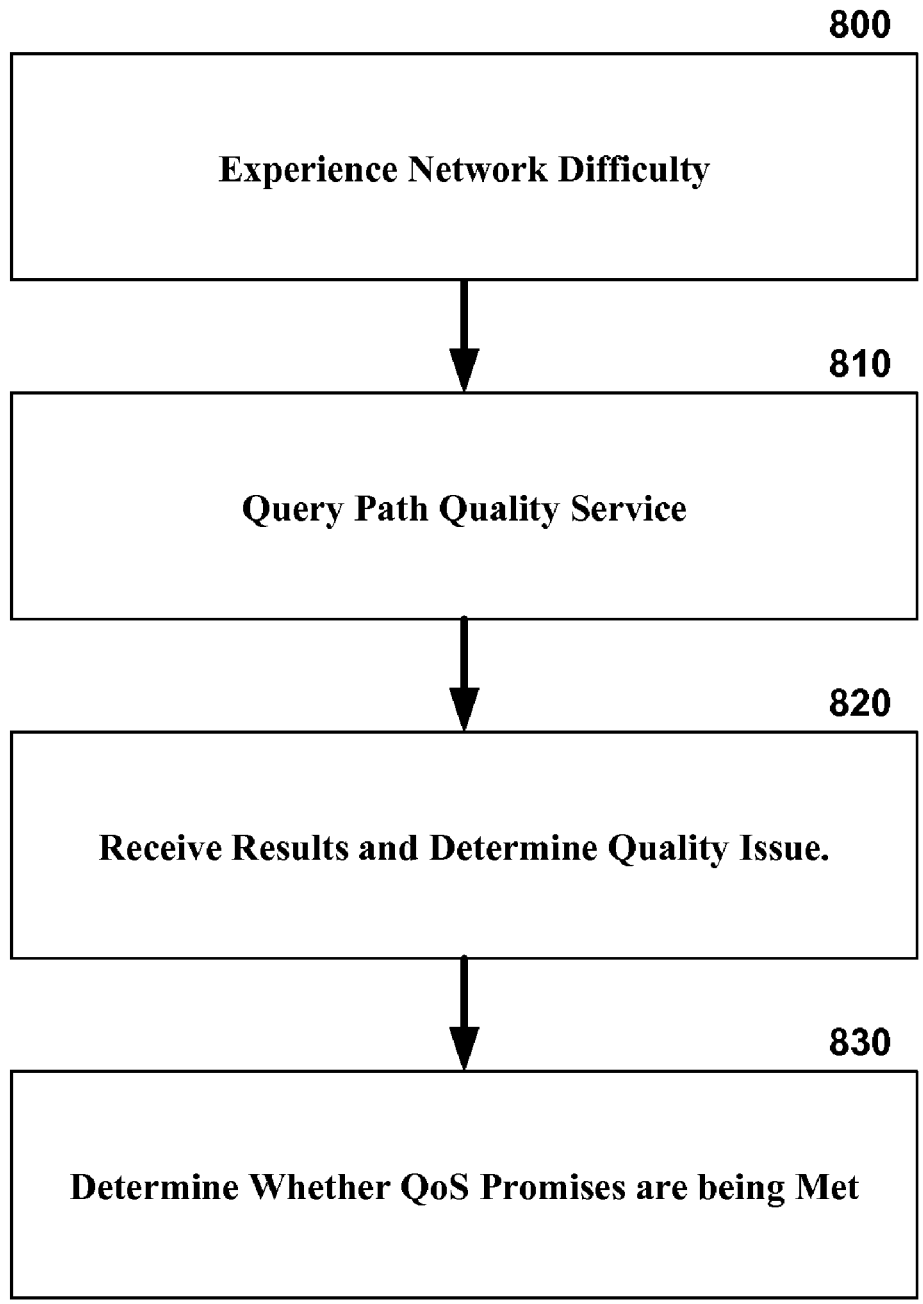
FIG. 8 is a flow diagram illustrating the exemplary use of the invention to determine sufficiency of service in view of a quality of service requirement in accordance with the invention.

FIG. 8 is a flow diagram illustrating an exemplary, non-limiting process for applying the path quality information aggregated by third parties in accordance with the invention. At 800, an endpoint experiences a network difficulty with respect to connection. At 810, the endpoint determines the PoP level paths to its desired destinations, e.g., via traceroute, and queries the path quality service to obtain path quality information for the PoP level paths. Then, at 820, the path quality information that was requested is received from one or more third parties. At 830, the endpoint determines whether the network difficulty is due to a failure to meet a quality of service requirement. In the past, when a client experiences difficulty with a connection, it is left helpless without information about what is wrong. With the invention, the path segments that are causing the difficulty can be determined, making a fix more identifiable.

Figure 9:
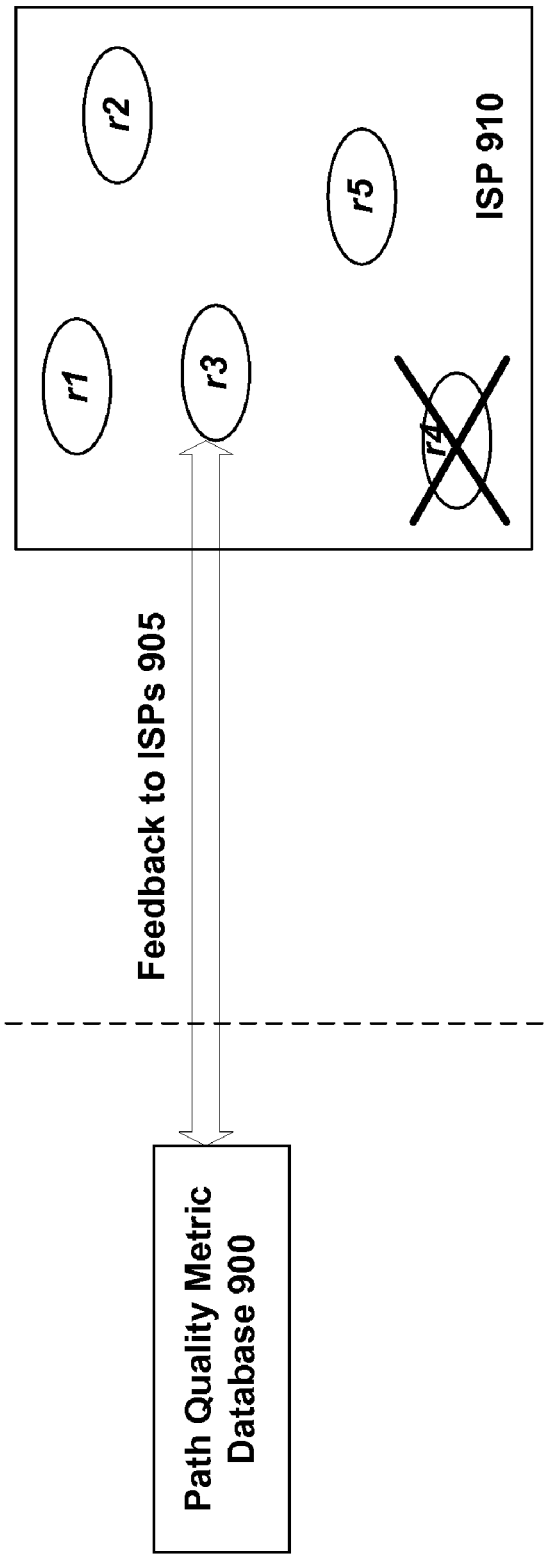
FIG. 9 is a block diagram of an embodiment of the invention in which an ISP makes use of path quality information to identify failed or failing routers within control of the ISP in accordance with the invention.

FIG. 9 illustrates yet another scenario that is enabled by the quality of path information service of the invention. In this regard, a cross ISP database 900 also has lots of information that is of benefit to individual ISPs. In this regard, a single ISP can design the above-described system to test router failures within the ISP machines via feedback 905. For instance, the techniques for ascertaining path quality information can help an ISP identify router r4 of routers r1, r2, r3, r4 and r5, which is failing for some reason.

In this regard, there is virtually no limit to the end use scenarios enabled by access to path quality information. Wherever endpoints may benefit from information about path qualities in their communication paths, the invention can be used effectively. Some specific examples of applications that can leverage accurate bandwidth estimation, for instance, include end system multicast and overlay network configuration protocols, content location and delivery in peer-to-peer (P2P) networks, network-aware cache or replica placement policies, flow scheduling and admission control policies at massively-accessed content servers. In addition, accurate measurements of network bandwidth are useful to network operators concerned with problems such as capacity provisioning, traffic engineering, network troubleshooting and verification of service level agreements (SLAs).

Bandwidth is also a key factor in several networking technologies. Several applications can benefit from knowing bandwidth characteristics of their network paths. For example, peer-to-peer applications form their dynamic user-level networks based on available bandwidth between peers. Overlay networks can configure their routing tables based on the bandwidth of overlay links. Network providers lease links to customers and usually charge based on bandwidth purchased.

With respect to SLAs between providers and customers, SLAs often define service in terms of available bandwidth at key interconnection, or network boundary, points. Carriers plan capacity upgrades in their network based on the rate of growth of bandwidth utilization of their users. Bandwidth is also a key concept in content distribution networks, intelligent routing systems, end-to-end admission control, and video/audio streaming.

Bandwidth estimation is also of interest to users wishing to optimize end-to-end transport performance, overlay network routing, and peer-to-peer file distribution. Techniques for accurate bandwidth estimation are also important for traffic engineering and capacity planning support. Even interactive applications, which are usually more sensitive to lower latency rather than higher throughput, can benefit from the lower end-to-end delays associated with high bandwidth links and low packet transmission latencies. Thus, one can see that ubiquitous access to up to date path quality information by endpoints of a network has virtually limitless applications.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with path quality services provided in accordance with the present invention. The present invention may apply to an environment with server computers and client computers deployed in a network environment or a distributed computing environment, having remote or local storage.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may request the path quality services of the invention.

Figure 10:
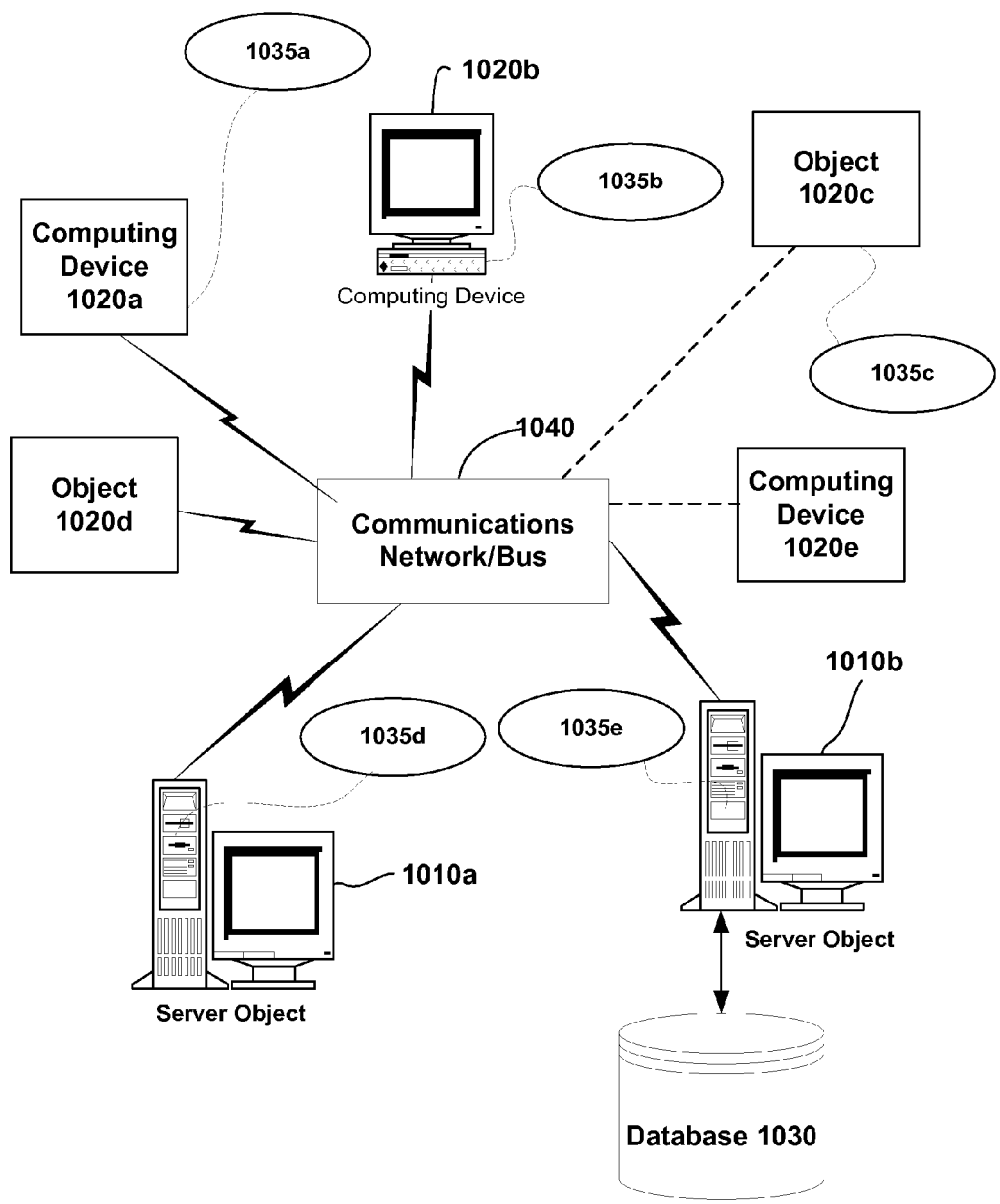
FIG. 10 is a block diagram representing an exemplary non-limiting networked environment in which the present invention may be implemented.

FIG. 10 provides a schematic diagram of an exemplary networked or distributed computing environment. The distributed computing environment comprises computing objects 1010a, 1010b, etc. and computing objects or devices 1020a, 1020b, 1020c, 1020d, 1020e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1040. This network may itself comprise other computing objects and computing devices that provide services to the system of FIG. 10, and may itself represent multiple interconnected networks. In accordance with an aspect of the invention, each object 1010a, 1010b, etc. or 1020a, 1020b, 1020c, 1020d, 1020e, etc. may contain an application that might make use of an API, or other object, software, firmware and/or hardware, suitable for communication with path quality services provided in accordance with the invention.

It can also be appreciated that an object, such as 1020c, may be hosted on another computing device 1010a, 1010b, etc. or 1020a, 1020b, 1020c, 1020d, 1020e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like, to connect to a path quality service in accordance with the invention.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the path quality services of the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 10, as an example, computers 1020a, 1020b, 1020c, 1020d, 1020e, etc. can be thought of as clients and computers 1010a, 1010b, etc. can be thought of as servers where servers 1010a, 1010b, etc. maintain the data that is then replicated to client computers 1020a, 1020b, 1020c, 1020d, 1020e, etc., although any computer can be considered a client, a server, or both, depending on the circumstances. Any of these computing devices may be processing data, recording measurements or requesting services or tasks that may implicate the path quality services in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing intelligent mappings to network address of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 10 illustrates an exemplary networked or distributed environment, with server(s) in communication with client computer (s) via a network/bus, in which the present invention may be employed. In more detail, a number of servers 1010a, 1010b, etc. are interconnected via a communications network/bus 1040, which may be a LAN, WAN, intranet, GSM network, the Internet, etc., with a number of client or remote computing devices 1020a, 1020b, 1020c, 1020d, 1020e, etc., such as a portable computer, handheld computer, thin client, networked appliance, or other device, such as a VCR, TV, oven and the like in accordance with the present invention. It is thus contemplated that the present invention may apply to any computing device in connection with which it is desirable to request network services.

In a network environment in which the communications network/bus 1040 is the Internet, for example, the servers 1010a, 1010b, etc. can be Web servers with which the clients 1020a, 1020b, 1020c, 1020d, 1020e, etc. communicate via any of a number of known protocols such as HTTP. Servers 1010a, 1010b, etc. may also serve as clients 1020a, 1020b, 1020c, 1020d, 1020e, etc., as may be characteristic of a distributed computing environment.

As mentioned, communications may be wired or wireless, or a combination, where appropriate. Client devices 1020a, 1020b, 1020c, 1020d, 1020e, etc. may or may not communicate via communications network/bus 14, and may have independent communications associated therewith. Each client computer 1020a, 1020b, 1020c, 1020d, 1020e, etc. and server computer 1010a, 1010b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 1010a, 1010b, 1020a, 1020b, 1020c, 1020d, 1020e, etc. may be responsible for the maintenance and updating of a database 1030 or other storage element, such as a database or memory 1030 for storing data processed or saved according to the invention. Thus, the present invention can be utilized in a computer network environment having client computers 1020a, 1020b, 1020c, 1020d, 1020e, etc. that can access and interact with a computer network/bus 1040 and server computers 1010a, 1010b, etc. that may interact with client computers 1020a, 1020b, 1020c, 1020d, 1020e, etc. and other like devices, and databases 1030.

Exemplary Computing Device

Figure 11:
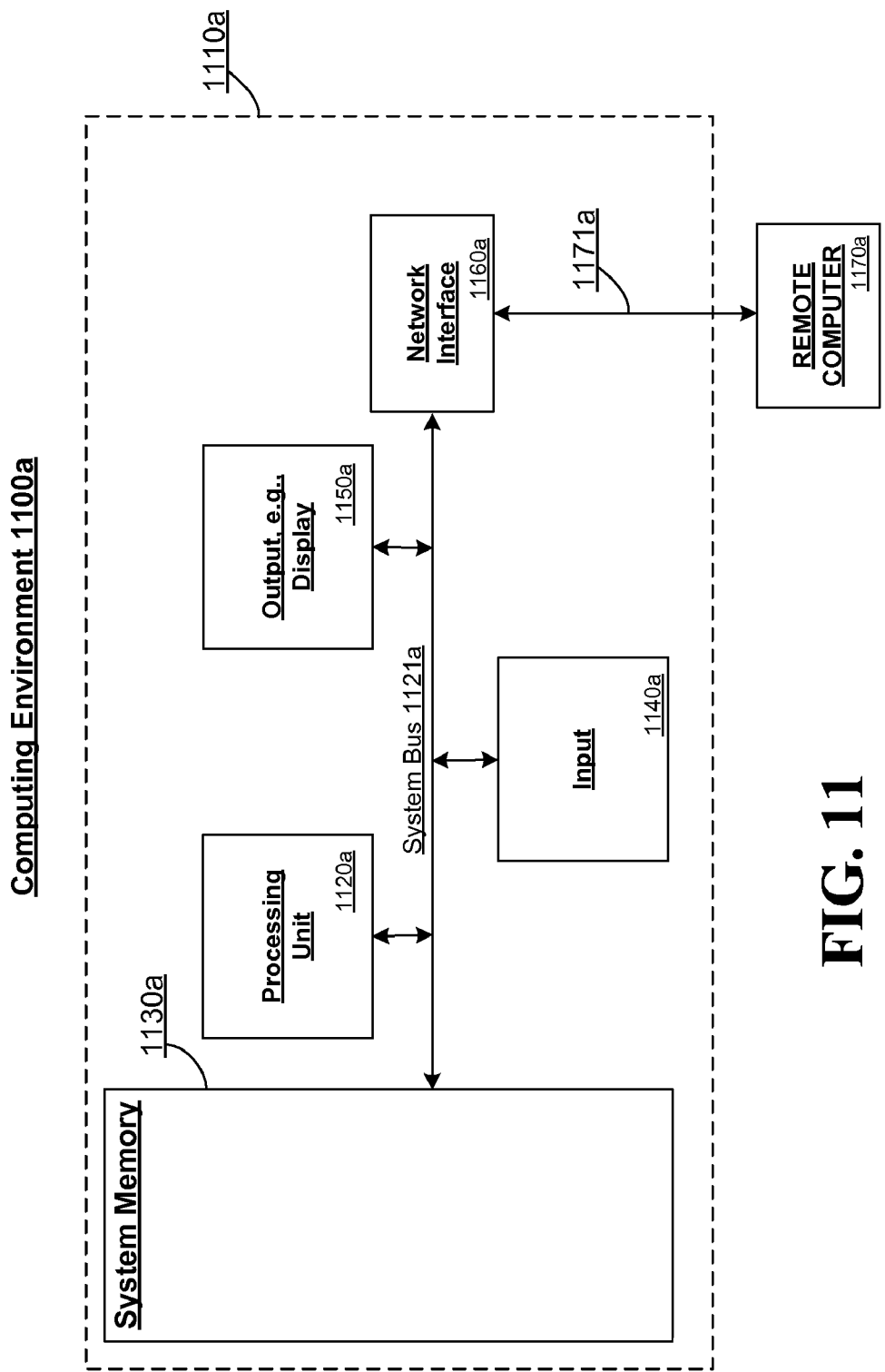
FIG. 11 is a block diagram representing an exemplary non-limiting computing system or operating environment in which aspects of the present invention may be implemented.

As mentioned, the invention applies to any device wherein it may be desirable to request network services. It should be understood, therefore, that handheld, portable and other computing devices and computing objects of all kinds are contemplated for use in connection with the present invention, i.e., anywhere that a device may request path quality services for a network address in a network. Accordingly, the below general purpose remote computer described below in FIG. 11 is but one example, and the present invention may be implemented with any client having network/bus interoperability and interaction. Additionally, service endpoints and/or beacon nodes can include, but are not limited to, functionality of the below general purpose computer.

As mentioned above, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 11 thus illustrates an example of a suitable computing system environment 1100a in which the invention may be implemented, although as made clear above, the computing system environment 1100a is only one example of a suitable computing environment for a media device and is not intended to suggest any limitation as to the scope of use or functionality of the invention. Neither should the computing environment 1100a be interpreted as having any dependency or requirement relating to any one or combination of components illustrated in the exemplary operating environment 1100a.

With reference to FIG. 11, an exemplary remote device for implementing the invention includes a general purpose computing device in the form of a computer 1110a. Components of computer 1110a may include, but are not limited to, a processing unit 1120a, a system memory 1130a, and a system bus 1121a that couples various system components including the system memory to the processing unit 1120a. The system bus 1121a may be any of several types of bus structures including a memory bus or memory controller, a peripheral bus, and a local bus using any of a variety of bus architectures.

Computer 1110a typically includes a variety of computer readable media. Computer readable media can be any available media that can be accessed by computer 1110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110a. Communication media typically embodies computer readable instructions, data structures, program modules or other data in a modulated data signal such as a carrier wave or other transport mechanism and includes any information delivery media.

The system memory 1130a may include computer storage media in the form of volatile and/or nonvolatile memory such as read only memory (ROM) and/or random access memory (RAM). A basic input/output system (BIOS), containing the basic routines that help to transfer information between elements within computer 1110a, such as during start-up, may be stored in memory 1130a. Memory 1130a typically also contains data and/or program modules that are immediately accessible to and/or presently being operated on by processing unit 1120a. By way of example, and not limitation, memory 1130a may also include an operating system, application programs, other program modules, and program data.

The computer 1110a may also include other removable/non-removable, volatile/nonvolatile computer storage media. For example, computer 1110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1121a through a non-removable memory interface such as an interface, and a magnetic disk drive or optical disk drive is typically connected to the system bus 1121a by a removable memory interface, such as an interface.

A user may enter commands and information into the computer 1110a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1120a through user input 1140a and associated interface(s) that are coupled to the system bus 1121a, but may be connected by other interface and bus structures, such as a parallel port, game port or a universal serial bus (USB). A graphics subsystem may also be connected to the system bus 1121a. A monitor or other type of display device is also connected to the system bus 1121a via an interface, such as output interface 1150a, which may in turn communicate with video memory. In addition to a monitor, computers may also include other peripheral output devices such as speakers and a printer, which may be connected through output interface 1150a.

The computer 1110a may operate in a networked or distributed environment using logical connections to one or more other remote computers, such as remote computer 1170a, which may in turn have media capabilities different from device 1110a. The remote computer 1170a may be a personal computer, a server, a router, a network PC, a peer device or other common network node, or any other remote media consumption or transmission device, and may include any or all of the elements described above relative to the computer 1110a. The logical connections depicted in FIG. 11 include a network 1171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 1110a is connected to the LAN 1171a through a network interface or adapter. When used in a WAN networking environment, the computer 1110a typically includes a communications component, such as a modem, or other means for establishing communications over the WAN, such as the Internet. A communications component, such as a modem, which may be internal or external, may be connected to the system bus 1121a via the user input interface of input 1140a, or other appropriate mechanism. In a networked environment, program modules depicted relative to the computer 1110a, or portions thereof, may be stored in a remote memory storage device. It will be appreciated that the network connections shown and described are exemplary and other means of establishing a communications link between the computers may be used.

There are multiple ways of implementing the present invention, e.g., an appropriate API, tool kit, driver code, operating system, control, standalone or downloadable software object, etc. which enables applications and services to use the path quality services of the invention. The invention contemplates the use of the invention from the standpoint of an API (or other software object), as well as from a software or hardware object that provides path quality services in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to request network services. For instance, the path quality services of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the path quality services of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide the path quality services of the various embodiments of the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A lookup service for facilitating a determination of path quality between a first endpoint node and a second endpoint node in a network of nodes, the network of nodes being directly or indirectly interconnected by a plurality of communication path segments, the lookup service comprising:
at least one data store for storing substantially up to date information about path quality for each of the plurality of communication path segments in the network; and
a lookup service, communicatively coupled to the at least one data store, which receives a request specifying path segments of a complete path between the first endpoint node and the second endpoint node in the network, and in response to the request, provides information about path quality for the path segments included in the complete path.

2. The lookup service according to claim 1, wherein the network of nodes includes nodes from at least one independently operated internet service provider (ISP).

3. The lookup service according to claim 1, wherein the plurality of communication path segments are defined by communication paths between points of presences (PoPs) in the network.

4. The lookup service according to claim 3, wherein the plurality of communication path segments are defined by communication paths between points of presences (PoPs) in the network including communication paths defined by PoPs of at least one independently operated internet service provider (ISP).

5. The lookup service according to claim 1, wherein the lookup service provides the information about path quality for the path segments operated by multiple Internet Service Providers (ISPs).

6. The lookup service according to claim 5, wherein the lookup service provides the information about path quality for the path segments based on an aggregation of information provided by the multiple ISPs.

7. The lookup service according to claim 1, wherein the information about path quality for the path segments in the network includes information about latency of the path segments.

8. The lookup service according to claim 1, wherein the information about path quality for the path segments in the network includes information about available bandwidth of the path segments.

9. The lookup service according to claim 1, wherein the information about path quality for the path segments in the network includes information about loss rate of the path segments.

10. A method for determining quality of path information for communications in a network, the method comprising:
determining, by a first endpoint of the network, a set of path segments comprising a complete path connection between the first endpoint and a second endpoint;
for the set of path segments, requesting, via a request that specifies the set of path segments, path quality information for each path segment of the set stored in at least one data store accessible via the network, the at least one data store being populated by multiple internet service providers (ISPs) based on path quality metrics that are regularly recorded at each point of presence (PoP) of the multiple ISPs with respect to other PoPs of the network;
receiving, by the first endpoint, the path quality information for each path segment of the set requested from the at least one data store.

11. The method of claim 10, further comprising:
authenticating the first endpoint to ensure authorized access of the at least one data store.

12. The method of claim 10, wherein the determining includes performing a traceroute operation with respect to the second endpoint.

13. The method of claim 10, further comprising:
determining, based on the path quality information, if a quality of service requirement is met for an application or service of the first endpoint.

14. A computer readable storage medium comprising computer executable instructions for performing the method of claim 10.

15. A computing device comprising means for performing the method of claim 10.

16. A computerized system, including:
a set of nodes including a first subset of nodes operated by a first internet service provider (ISP) and a second subset of nodes operated by a second ISP wherein each node of the set of nodes comprises a set of directly connected routers and each node of the set of nodes measures path quality information about communication path segments connecting to other directly connected nodes of the set of nodes operated by either the first or the second ISP, wherein measuring the path quality information does not depend on obtaining path quality metrics from a router or switch; and
at least one path quality information database store operated by the first ISP and/or the second ISP, and accessible via query by a third party, for;
receiving substantially up to date path quality information about path quality of each of the communication path segments of each associated node of the set of nodes; and
servicing a request specifying multiple contiguous communication path segments of a complete path between a first endpoint node and a second endpoint node of a network having the set of nodes by providing path quality information for each of the multiple contiguous communication path segments.

17. The computerized system of claim 16, wherein the path quality information in the at least one path quality information database store is transmitted to at least one aggregation component that aggregates path quality information received from different path quality information stores maintained by different ISPs into a cross ISP database accessible via query by the third party.

18. The computerized system of claim 17, wherein at least some of the set of directly connected routers belong to a point of presence (PoP).

19. The computerized system of claim 17, wherein endpoint nodes of the network consult the at least one aggregation component to determine path quality information of each designated path segment of the communication path segments.

20. The computerized system of claim 19, wherein endpoint nodes of the network consult the at least one aggregation component to determine one or more of latency, available bandwidth or loss rate of each designated path segment, whereby the designated path segments are determined by traceroute, the path quality information being obtained by measurement boxes associated with one or more of the nodes of the set of nodes.

* * * * *